(No Model.) 2 Sheets—Sheet 2.
R. BARKER.
APPARATUS FOR EXTRACTING GOLD AND SILVER FROM THEIR ORES.
No. 273,011. Patented Feb. 27, 1883.
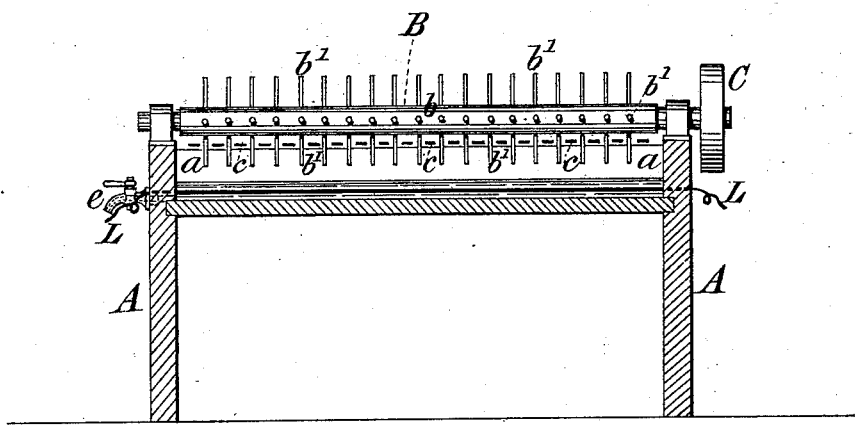
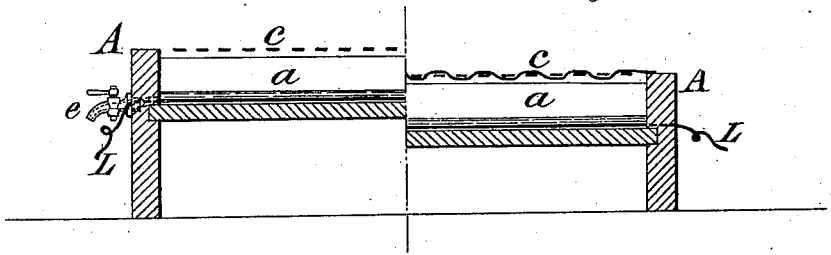
Witnesses
Richard Barker, Inventor.

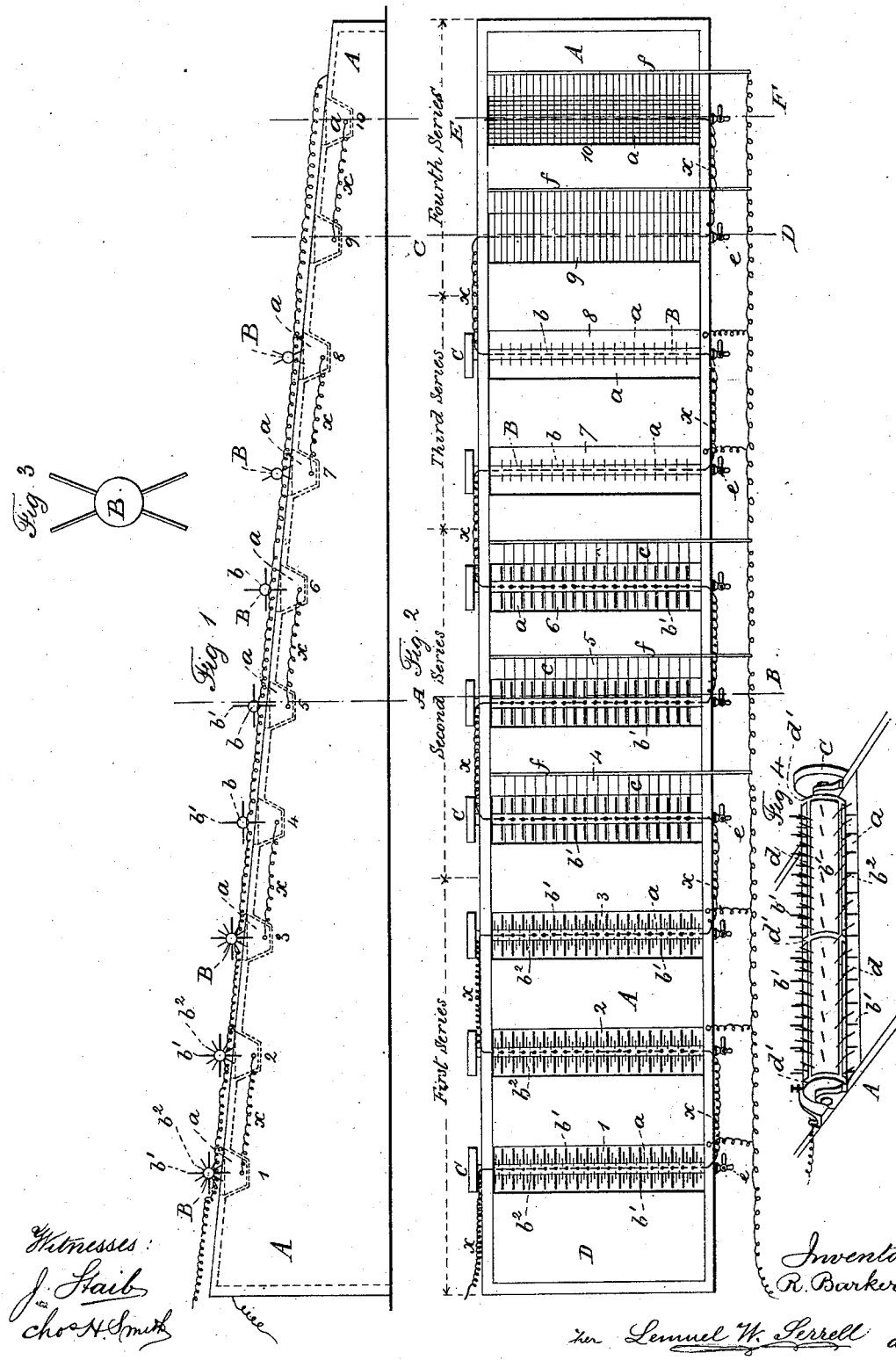

UNITED STATES PATENT OFFICE.

RICHARD BARKER, OF LONDON, COUNTY OF MIDDLESEX, ENGLAND.

APPARATUS FOR EXTRACTING GOLD AND SILVER FROM THEIR ORES.

SPECIFICATION forming part of Letters Patent No. 273,011, dated February 27, 1883.

Application filed October 20, 1882. (No model.) Patented in England June 28, 1882, No. 3,046.

*To all whom it may concern:*

Be it known that I, RICHARD BARKER, a subject of the Queen of Great Britain and Ireland, and a resident of London, in the county of Middlesex, England, have invented new and useful Apparatus for Extracting Gold and Silver from their Ores, (for which I have obtained provisional protection in Great Britain on the 28th day of June, 1882, No. 3,046,) of which the following is a specification.

My invention relates to means or apparatus for extracting gold and silver from their ores by the combined action of electricity and mercury; and for the purpose of my invention I provide a table, insulated or not, in which I place two or more riffles or baths containing mercury, at convenient distances from one another, and fitted or not with the ordinary agitators. Over this table the quartz, alluvial deposit, or other matter containing gold, silver, or both these metals is washed by the ordinary method. A current of electricity is then passed through the apparatus by one or more suitable conductors in the following manner: The negative pole (or cathode) of the battery or other source of electricity is connected with the mercury in the riffles, and the positive pole (or anode) is introduced into the water immediately above the mercury and sufficiently close to it to cause an energetic action, the electric current being allowed to pass through the water by placing in it, at convenient distances, plates or wires of copper or other good conductors of electricity. The introduction of an electric current into the water, as above specified, causes continual agitation of the auriferous material and sand at the surface of the mercury, prevents it from "sickening" in the presence of arsenic, sulphur, oil, or any other known substances which are deleterious to the action of mercury in amalgamating with gold or silver, and also prevents titaniferous or titanic sand or other heavy mineral deposits from remaining on the surface—that is to say, the surface of the mercury, immediately under and around the copper plates, wires, or the like is kept thoroughly bright and capable of amalgamating readily with gold and silver, despite the presence of foreign substances. The conducting plates, wires, or the like I make either stationary or movable, and attached to the riffles, taking care, however, that, if revolving or otherwise in motion, the plates or wires shall never come in contact with the mercury.

And in order that my invention may be readily understood and carried into effect by any one skilled in the art or process to which it relates, I proceed to describe the same with reference to the accompanying drawings.

Figure 1 is a longitudinal elevation, and Fig. 2 a plan, of my improved electro-amalgamator; Figs. 3 and 4, details of certain parts. Fig. 5 is a vertical cross-section of the amalgamator at the line A B of Fig. 2. Fig. 6 is a partial cross-section at the line C D of Fig. 2, and Fig. 7 is a partial cross-section at the line E F of Fig. 2.

A is the riffle-table, in which are formed the riffles *a a a*. This table and the riffles may be made in one piece or otherwise, as may be most convenient. The material I prefer to employ in the construction of my riffle-table and riffles is wood; but iron, porcelain, earthenware, (glazed or unglazed,) or any combination of the above-mentioned materials may be employed. The number of riffles in a table depends upon the nature of the ore to be treated. Where the ore is refractory, ten riffles, as shown, or more may be required. In the first series three riffles are shown, each one provided with combined revolving mechanical stirrers and revolving anodes (electrodes) B. Each set of stirrers consists of a shaft, *b*, to which are attached arms or pins $b'$, which act as the stirrers, and a second set of arms or pins, $b^2$, which act as the electrodes. These shafts are kept in constant contact with the main current of electricity by means of any suitable connection. The mechanical stirrers are designedly longer than the electrodes. The object in making the electrodes shorter than the stirrers is to prevent them from coming into contact with the mercury, which would otherwise destroy the whole operation. In the second series the stirrers are the same as described in the first series; but instead of the electric current being supplied along the shaft it is conveyed by wires or plates *c*, which are laid across the riffle, as seen in plan, Fig. 2, a little above the mercury, special care being taken that they shall not come into contact with the mercury. In the third series the mechanical stirrers are dispensed with, but the current is rendered intermittent by means of a special construction of revolving electrode B, and is supplied along the shaft, as in the first series, but in such a manner that when the arms or pins are perpendicular, as in Fig. 1, the current is caused to flow, and when horizontal the current is interrupted. This special construction of revolving electrode is clearly shown in detailed view and on a larger scale in Fig. 3. In the third series the pins or arms $b$ act not only as conveyers for the electric current, as described, but they act as stirrers to agitate the ore, the same as do the arms $b'$ in the first series, and the amalgamation of the metal is the same as in the foregoing series. The current, being intermittent, passes in the form of a shock, and its action is more energetic. In both the first and the third series I establish the electric connection by strips $d$ and bands $d'$, of metal, arranged on the surface of the shaft, as clearly shown in detailed view, Fig. 4, or by a metallic core in contact with the inner ends of the electrodes. The shafts are made of wood, the stirrers of any suitable non-conducting material, and the electrodes (anodes) of brass or any other hard and durable metal. The shafts may also be made of metal, and where metal is used the shafts would be insulated in the usual way. In the fourth series I dispense with the shafts and stirrers, and in this instance the electrodes are carried across the riffles, either as shown in the ninth riffle in Fig. 2, or interlaced, as shown in the tenth riffle. In all cases care must be taken that the electrodes (anodes) shall never come into contact with the mercury, (cathodes.) Each riffle is provided at bottom with a tap or cock, $e$, by means of which the mercury may be drawn off; or the conducting-wire may be passed through the heads of the plugs of the taps or cocks, and when desired to run off the mercury this wire must be disconnected and removed. The electric current is supplied direct to one end of the first riffle, and, passing through the mercury, is then conveyed or led out by the wire L to the adjoining riffle, and so on to the whole series of riffles, as shown in full lines and dotted lines in Fig. 2. The return-current to the electric generator in the first and third series is conveyed by depressing screws suitably placed for the purpose on the side of the riffle-table, and in immediate proximity to the shafts, so as to come into contact with the metallic bands $d'$, but in the second and fourth series by the bars $ff$. At that side of the riffle-table opposite to the discharge taps or cocks each shaft carries a pulley, C, for the purpose of revolving the same, and the pulleys may be driven by any suitable gearing. The most suitable speed for the shaft is forty-five revolutions per minute. Mercury is supplied to each riffle in the manner employed in the ordinary amalgamation, and in my invention discharges the duty of a cathode in each riffle.

The ore is supplied to the platform D in the usual way. The table A is placed at a suitable inclination, and a current of water is applied in such a manner that the ore is caused to travel down the table and pass through each of the riffles, between the several sets of electrodes, (cathodes and anodes.) In consequence of the poles being placed one in the mercury and the other in the superincumbent water the electric current causes the particles of the crushed quartz or sand to be in constant motion, and the upper stratum displaces the lower and comes in contact with the mercury, even if there be no flow of water, thus producing a constant agitation and insuring perfect contact between the mercury and the particles of gold and silver, which would otherwise be lost, as the titanic sand, &c., would form a layer upon the surface of the mercury, and so cause imperfect amalgamation, with a consequent loss of gold or of silver.

Having now described my invention, I claim and desire to secure by Letters Patent—

1. In an apparatus employing mercury and water for the separation of gold and silver from their ores, the combination, with the riffles, of the revolving mechanical stirrers and the revolving electrodes, (anodes,) as described and shown, and for the purposes set forth.

2. In an apparatus employing mercury and water for the separation of gold and silver from their ores, the combination, with the riffles, of the revolving mechanical stirrers, constructed as pins radiating from a central shaft, and the stationary electrodes, (anodes,) constructed as plates of metal, between which the revolving stirrers operate, as described and shown, and for the purposes set forth.

3. In an apparatus for amalgamating gold and silver, the combination, with the riffles (7 and 8) and the mercury in the same, of the revolving electrodes (anodes) and circuit-connections for transmitting an intermittent current of electricity through the apparatus, substantially as and for the purposes set forth.

4. The combination, with the riffles (9 and 10) and the mercury in the same, and an incline over which the water and ore is permitted to travel, of stationary anodes formed of interlaced wires or bars of metal above the mercury, and electric circuit-connections to the bars and mercury, respectively, for amalgamating gold and silver from their ores, substantially as specified.

In testimony whereof I affix my signature this 29th day of September, 1882, in presence of two witnesses.

RICHARD BARKER.

Witnesses:
ERNEST DE CASS,
68 *Fleet Street, London.*
J. WATT,
17 *Gracechurch Street, London.*